(12) United States Patent
Niimi

(10) Patent No.: US 7,311,936 B2
(45) Date of Patent: Dec. 25, 2007

(54) INTEGRAL SKIN INTERIOR TRIM

(75) Inventor: Shingo Niimi, Hiroshima (JP)

(73) Assignee: DaikyoNishikawa Corporation, Hiroshima (JP)

( * ) Notice: Subject to any disclaimer, the term of this patent is extended or adjusted under 35 U.S.C. 154(b) by 113 days.

(21) Appl. No.: 11/359,502

(22) Filed: Feb. 23, 2006

(65) Prior Publication Data

US 2006/0237988 A1 Oct. 26, 2006

(30) Foreign Application Priority Data

Apr. 21, 2005 (JP) ............... 2005-124082

(51) Int. Cl.
*B32B 5/00* (2006.01)
*D60J 5/00* (2006.01)
(52) U.S. Cl. .......... 427/71; 428/76; 428/172; 428/192; 296/146.7
(58) Field of Classification Search .......... 428/71, 428/76, 172, 192; 296/146.7
See application file for complete search history.

(56) References Cited

U.S. PATENT DOCUMENTS 5,922,431 A * 7/1999 Funato et al. .......... 428/71

5,945,200 A 8/1999 Suzuki

FOREIGN PATENT DOCUMENTS

| JP | 9-76256 | 3/1997 |
|---|---|---|
| JP | 10-315249 | 12/1998 |

* cited by examiner

*Primary Examiner*—Donald J. Loney
(74) *Attorney, Agent, or Firm*—Nixon Peabody LLP; Donald R. Studebaker

(57) ABSTRACT

While a corner part 35 of a skin 7 formed between side covers 30 and 31 has a sector shape, a corner part 29 of a base material 9 also has a sector shape. When resin is charged between the skin 7 and the base material 9, the sector-shaped corner part 35 is bent under a pressure at which the resin is charged to stretch outward, thereby bringing the sector-shaped corner part 35 into absolute contact with the sector-shaped corner part 29 of the base material 9. This prevents resin leakage from between the skin 7 and the base material 9.

4 Claims, 7 Drawing Sheets

INTEGRAL SKIN INTERIOR TRIM

CROSS-REFERENCE TO RELATED APPLICATIONS

This application claims priority under 35 U.S.C. §119 on patent application No. 2005-124082, the entire contents of which are hereby incorporated by reference.

BACKGROUND OF THE INVENTION (1) Field of the Invention

The present invention relates to improvement of integral skin interior trims, and more particularly relates to countermeasures against resin leakage from the corners of integral skin interior trims.

(2) Description of Related Art

Disclosed in Page 4 and FIG. 1 of Japanese Unexamined Patent Publication No. 9-76256 is an integral skin interior trim in which a resin interlayer is formed between and integrally with a skin and a base material. In this Patent Document, the end parts of the skin are bent downwardly to cover the sides of the resin interlayer and make tight contact at their outer faces with the vertical walls of the base material. Furthermore, the rigidities of the skin end parts are enhanced by increasing the thicknesses thereof. This secures contact between the outer faces of the skin end parts and the vertical walls of the base material, resulting in improved sealing function therebetween. This prevents resin leakage in the charging of the resin for the formation of the resin interlayer between the skin and the base material.

In the case where the skin end parts of the integral skin interior trim have corners, the increase in the rigidities of the skin end parts as disclosed in the Patent Document makes it difficult that the outer faces of the skin end parts extend along the vertical walls of the base material. As a result, clearances are produced therebetween. This causes the resin leakage from between the outer faces of the skin end parts and the vertical walls of the base material. As illustrated in FIGS. 12A and 12B, in particular, when the skin is slush-molded, a large amount of resin is concentrated inside each of corners c of the end parts b of a skin a in the molding of the skin a, thereby forming a thicker part d at the corner c. As a result, the rigidity of the corner c is enhanced too much. When a resin interlayer f is to be molded between and integrally with the skin a and the base material e by placing the skin a on the base material e and charging resin between the skin a and the base material e, a clearance is produced therebetween, resulting in leakage of the resin. The reason for this is that the corner c is less likely to extend along the face g of the base material e to be sealed even when the pressure at which the resin is charged between the skin a and the base material e is applied to the corner c.

SUMMARY OF THE INVENTION

The present invention has been made to solve the aforementioned problem, and an object of the present invention is to prevent resin leakage from the corners of the skin end parts and base material.

In order to attain the above object, the present invention is characterized in that the corners of the skin end parts and base material are devised in their shapes.

An integral skin interior trim according to a first aspect of the present invention comprises: a resin interlayer; a flexible skin; and a rigid base material, said resin interlayer being molded between and integrally with the skin and the base material, wherein: the skin comprises an upper cover covering the top face of the interlayer, side covers extending from two edges of the upper cover between which a corner is formed to cover the sides of the interlayer corresponding to the two edges, and an under flange extending from the end of one of the side covers to enter between the rear face of the interlayer and the base material; the base material comprises a cover contact face coming into tight contact with the outer face of the other of the side covers and a flange contact face coming into tight contact with the lower face of the under flange; the side covers are connected to each other to form a corner; the other of the side covers is connected to the under flange through a sector-shaped corner part of the skin gradually increasing in width in the direction going from the corner formed between the side covers toward the distal end of the under flange; and the cover contact face and flange contact face of the base material are connected to each other through a sector-shaped corner part of the base material corresponding to the sector-shaped corner part of the skin.

In view of the above, when resin is charged between the skin and the base material, the sector-shaped corner part of the skin bend under a pressure at which resin is charged to stretch outward. Thus, the sector-shaped corner part of the skin comes into tight contact with the sector-shaped corner part of the base material. In this way, reliable sealing between the skin and the base material can prevent the resin leakage from therebetween, thus providing an integral skin interior trim with an excellent appearance. Furthermore, both the sector-shaped corner parts are shaped to gradually increase in width in the direction going from the corner formed between the side covers of the skin toward the distal end of the under flange. This prevents the sector-shaped corner parts from affecting the appearance of the trim. Therefore, a corner region of the skin can achieve a sharp appearance corresponding to the corner formed between the side covers.

An integral skin interior trim according to a second aspect of the present invention comprises: a resin interlayer; a flexible skin; and a rigid base material, said resin interlayer being molded between and integrally with the skin and the base material, wherein: the skin comprises an upper cover covering the top face of the interlayer and side covers extending from two edges of an upper cover between which a corner is formed to cover the sides of the interlayer corresponding to the two edges; the base material comprises cover contact faces coming into tight contact with the outer faces of the side covers; the side covers are connected to each other through a sector-shaped corner part of the skin gradually increasing in width in the direction going from the upper cover side toward the distal ends of the side covers; and the cover contact faces of the base material are connected to each other through a sector-shaped corner part of the base material corresponding to the sector-shaped corner part of the skin.

Also in the second aspect of the present invention, like the first aspect of the present invention, the sector-shaped corner part formed between the side covers of the skin bends under the resin charging pressure to stretch outward. Thus, the sector-shaped corner part of the skin comes into tight contact with the sector-shaped corner part of the base material. In this way, reliable sealing between the skin and the base material can prevent the resin leakage from therebetween, thus providing an integral skin interior trim with an excellent appearance. Furthermore, both the sector-shaped corner parts are shaped to gradually increase in width in the direction going from the upper cover side of the skin toward the distal ends of the side covers. This prevents the sector-shaped corner parts from affecting the appearance of the trim. Therefore, a corner region of the upper cover of the skin can achieve a sharp appearance.

According to a third aspect of the present invention, in the integral skin interior trim of the first or second aspect, the sector-shaped corner parts may be both curved to expand outward. Therefore, the sector-shaped corner part of the skin easily bends under the resin charging pressure to stretch outward. This is advantageous in tight contact between the sector-shaped corner parts of the skin and the base material.

According to a fourth aspect of the present invention, in the integral skin interior trim of the first or second aspect of the present invention, the skin may be slush-molded.

More particularly, the use of the slush molding has conventionally facilitated increase in the thicknesses of corner parts of a skin. However, the above-mentioned sector-shaped corner parts make it difficult to increase their thicknesses. This easily secures the flexibilities of the corner parts. This is advantageous in enhancement in the sealing function between the sector-shaped corner parts of the skin and the base material when the sector-shaped corner part of the skin is brought into tight contact with the sector-shaped corner part of the base material.

DETAILED DESCRIPTION OF THE INVENTION

The present invention will be described hereinafter in more detail with reference to preferred embodiments of the present invention.

Embodiment 1

Figure 1:
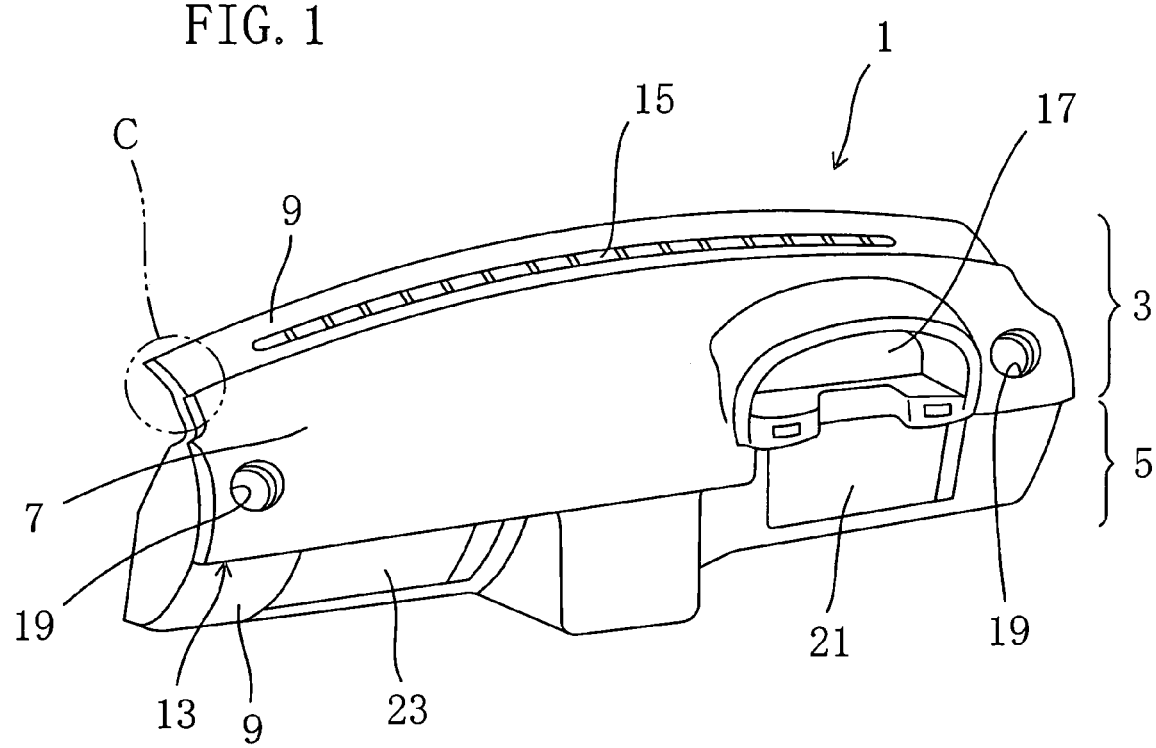
FIG. 1 is a perspective view of an instrument panel according to a first embodiment of the present invention.
Figure 2:
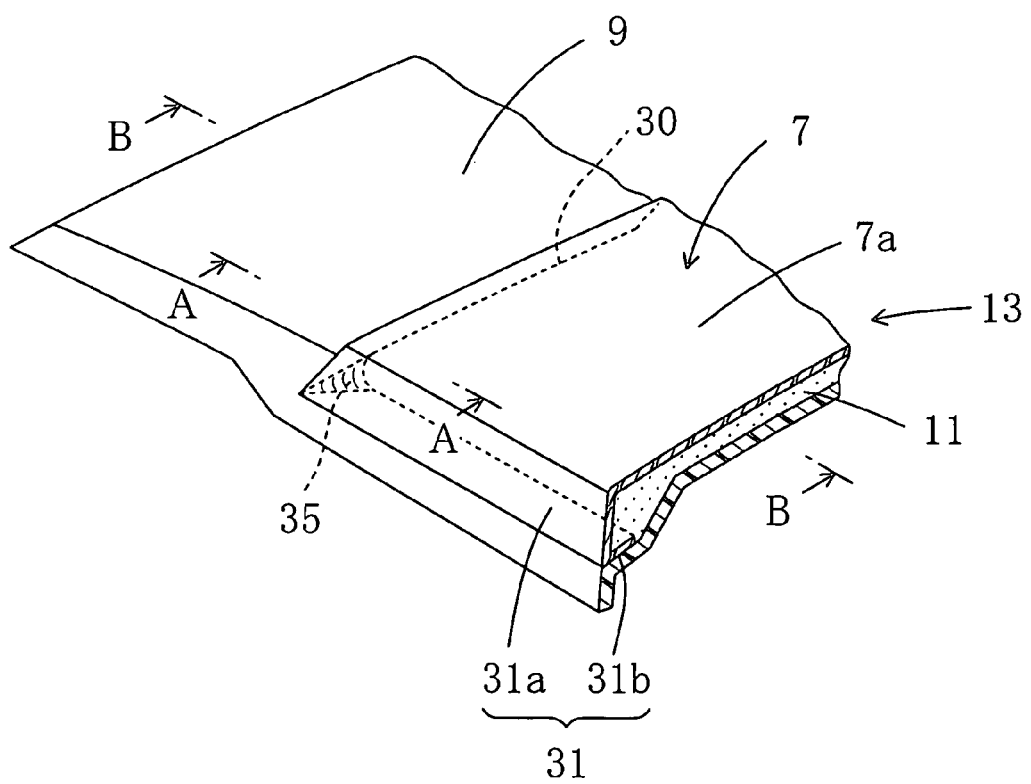
FIG. 2 is an enlarged perspective view of a part C of the instrument panel in FIG. 1.

FIG. 1 illustrates an automotive instrument panel 1 as an integral skin interior trim according to a first embodiment of the present invention. The instrument panel 1 is formed of an upper panel part 3 and a lower panel part 5. As illustrated in FIG. 2, the part of the upper panel part 3 excluding a part thereof closer to the front end of the automotive body forms a three-layer pad part 13 obtained by molding a resin interlayer 11 between and integrally with a flexible resin skin 7 and a rigid resin base material 9. The part of the upper panel part 3 closer to the front end of the automotive body forms a single layer in which the base material 9 is exposed, and an air outlet 15 for a front defroster (hereinafter, referred to as "front-defroster air outlet 15") is formed in the above part of the upper panel part 3 to extend along the width of the automotive body.

The flexible resin skin 7 is made of a flexible, soft material, such as polyvinyl chloride or thermoplastic olefin, and molded in a predetermined shape by vacuum molding, slush molding, or any other method. The rigid resin base material 9 is made of a rigid material, such as polypropylene or ABS resin, and molded in a predetermined shape by injection molding or any other method. The resin interlayer 11 is formed by injecting and charging a fluid thermoplastic resin, such as polypropylene, between the resin skin 7 and the resin base material 9 and then curing the thermoplastic resin.

As illustrated in FIG. 1, a recess 17 for containing a meter (hereinafter, referred to as "meter-containing recess 17") is formed in the right-hand region of the pad part 13, and air outlets 19 for side defrosters (hereinafter, referred to as "side-defroster air outlets 19") are formed in both lateral end regions thereof. The lower panel part 5 forms a single layer in which the base material 9 is exposed like the part of the upper panel part 3 closer to the front end of the automotive body. A part of the lower panel part 5 located immediately below the meter-containing recess 17 is formed with an opening 21 for attachment of a steering system, and the lower panel part 5 is formed at its left-hand region with an opening 23 for attachment of a glove box.

Figure 3:
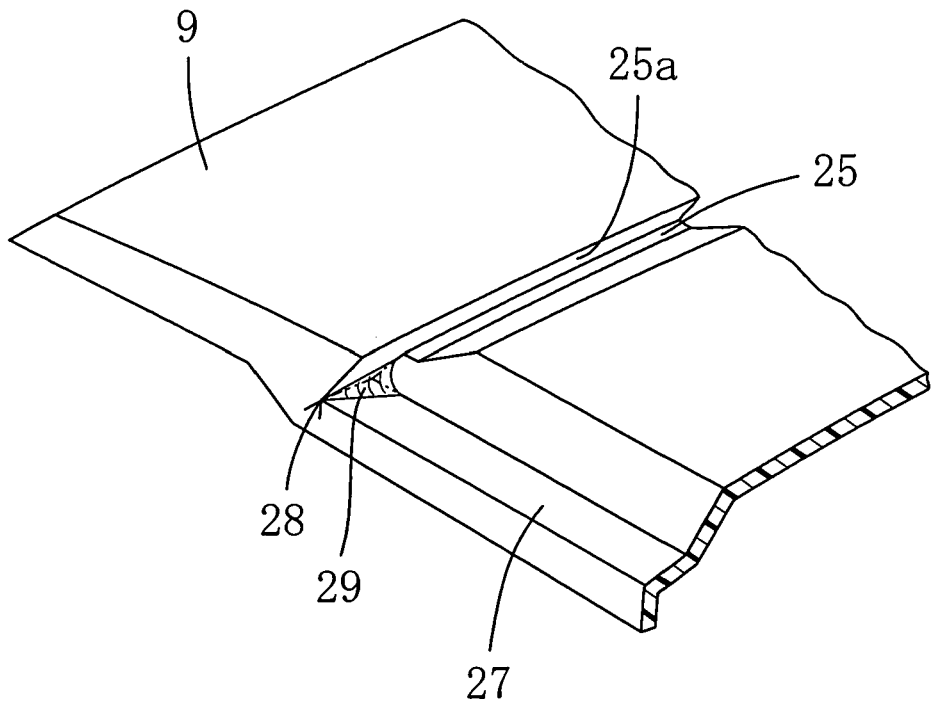
FIG. 3 is a perspective view illustrating a part of a base material according to the first embodiment.

As illustrated in FIG. 3, a groove 25 is formed in front of the front-defroster air outlet 15 of the base material 9 to extend over the whole width of the automotive body along the front-defroster air outlet 15. Both lateral ends of the base material 9 are formed with flat faces 27 extending toward the rear of the automotive body continuously with both lateral ends of the groove 25. The flat faces 27 located at the lateral ends of the base material 9 are formed at a lower level than the top face of the middle part thereof. Sector-shaped corner parts 29 are formed at the locations 28 of the corners formed between the groove 25 and the flat faces 27. The sector-shaped corner parts 29 are formed to have outwardly expanding curved faces generally horizontally extending inward from the outer corners of the flat faces 27 and gradually increasing in width so as to be generally sector-shaped. In other words, they are formed to have a radius shape.

Figure 4:
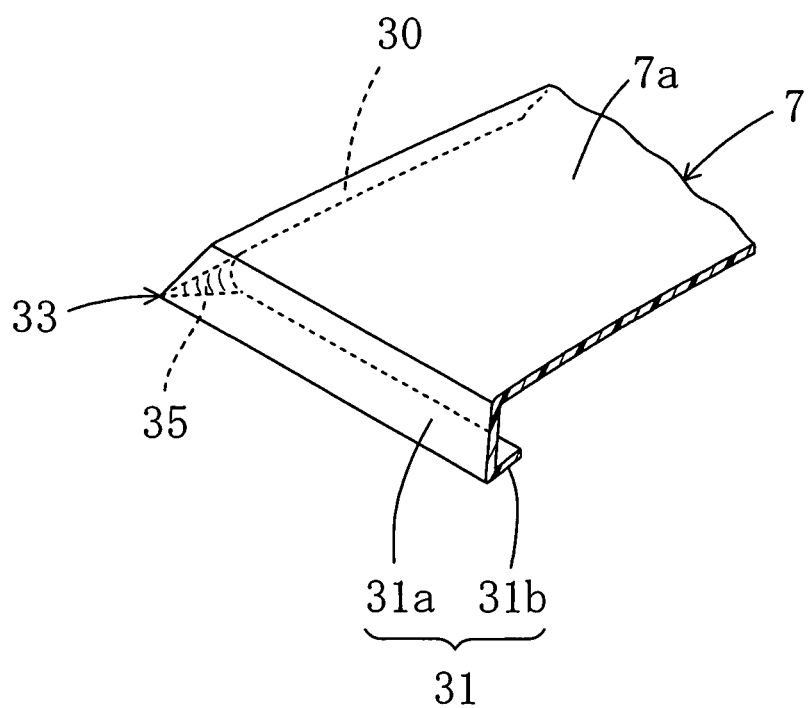
FIG. 4 is a perspective view illustrating a part of a skin according to the first embodiment.
Figure 5:
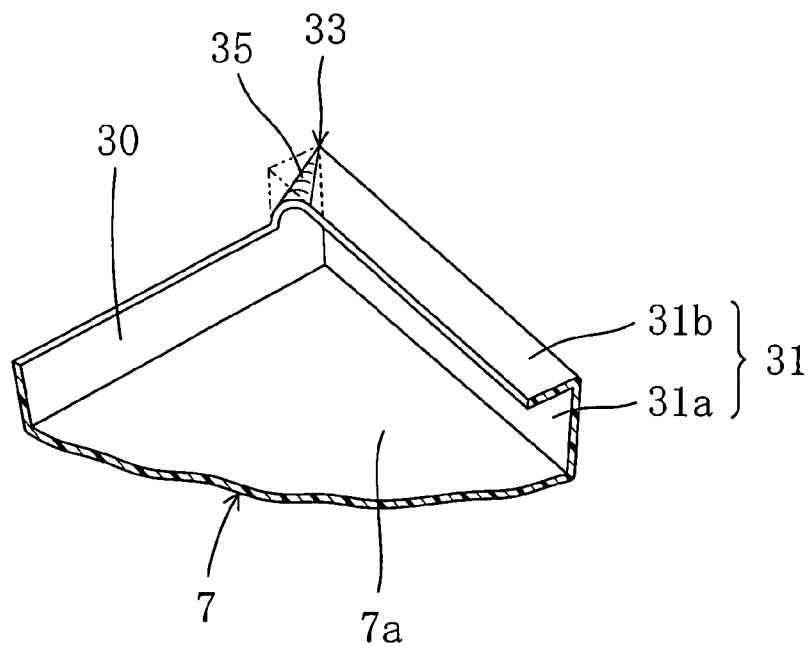
FIG. 5 is a perspective view illustrating a part of the skin when viewed from the back side thereof.

On the other hand, as illustrated in FIGS. 4 and 5, the skin 7 includes an upper cover 7a, a front side cover 30 and right and left L-shaped covers (only the left one is illustrated) 31. The covers 7a, 30 and 31 are formed continuously. The upper cover 7a covers the top face of the resin interlayer 11 and forms a flat top face of the pad part 13. The front side cover 30 is inclined toward the front of the automotive body and downward from the edge of the upper cover 7a closer to the front of the automotive body and covers the front side of the resin interlayer 11. The right or left L-shaped covers 31 include side covers 31a that extend downward from the edges of the upper cover 7a closer to both lateral sides of the automotive body and cover the left and right sides of the resin interlayer 11 and under flanges 31b that is formed continuously with the side covers 31a to enter between the rear face of the resin interlayer 11 and the base material 9. The side covers 31a are formed to become square to the upper cover 7a.

The front side cover 30 is continuous with the side covers 31a such that corners are formed between the front side cover 30 and the side covers 31a. The front side cover 30 is connected through sector-shaped corner parts 35 to the under flanges 31b. These sector-shaped corner parts 35 correspond to the sector-shaped corner parts 29 of the base material 9 and are formed to have outwardly expanding curved faces generally horizontally extending from corners 33 formed between the side covers 30 and 31a toward the distal ends of the under flanges 31b and gradually increasing in width so as to be generally sector-shaped. In other words, they are formed to have a radius shape.

Figure 6:
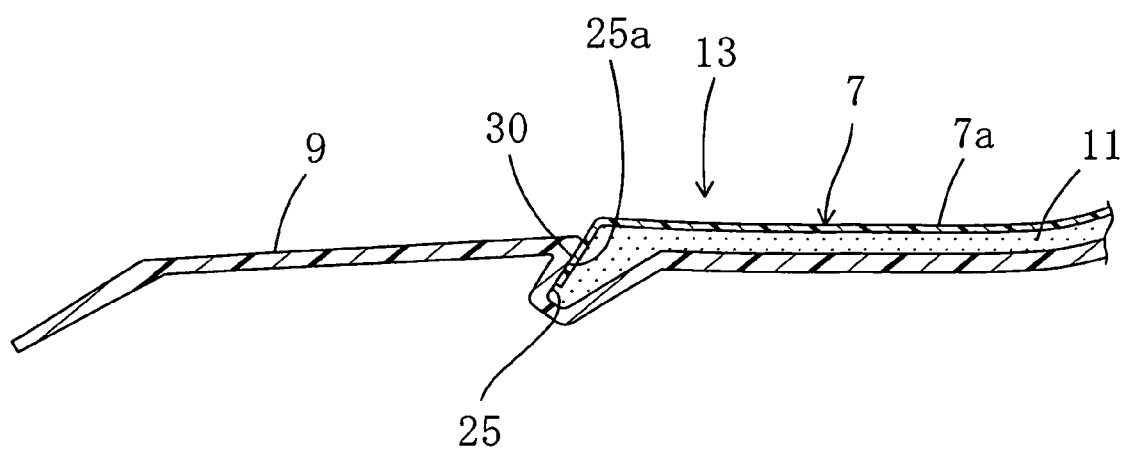
FIG. 6 is a cross-sectional view taken along the line B-B in FIG. 2.

The front side wall of the groove 25 of the base material 9 forms a face 25a of the base material 9 coming into tight contact with the outer face of the front side cover 30 of the skin 7 (hereinafter, referred to as "cover contact face 25a"). The flat faces 27 located at both lateral ends of the base material 9 form faces of the base material 9 coming into tight contact with the lower faces of the under flanges 31b (hereinafter, referred to as "flange contact faces"). The skin 7 and the base material 9 are sealed in the following manner: As illustrated in FIG. 6, the outer face of the front side cover 30 of the skin 7 comes into tight contact with the cover contact face 25a of the base material 9, and as illustrated in FIG. 2, the lower faces of the under flanges 31b of the skin 7 come into tight contact with the flange contact faces 27 of the base material 9. In other words, leakage of resin is prevented in charging of the resin forming the resin interlayer 11 between the skin 7 and the base material 9. Furthermore, although not illustrated, the skin 7 and the base material 9 are sealed such that a part of the skin 7 closer to the rear end of the automotive body also comes into tight contact with the top face of the base material 9, thus preventing the resin leakage.

Figure 7:
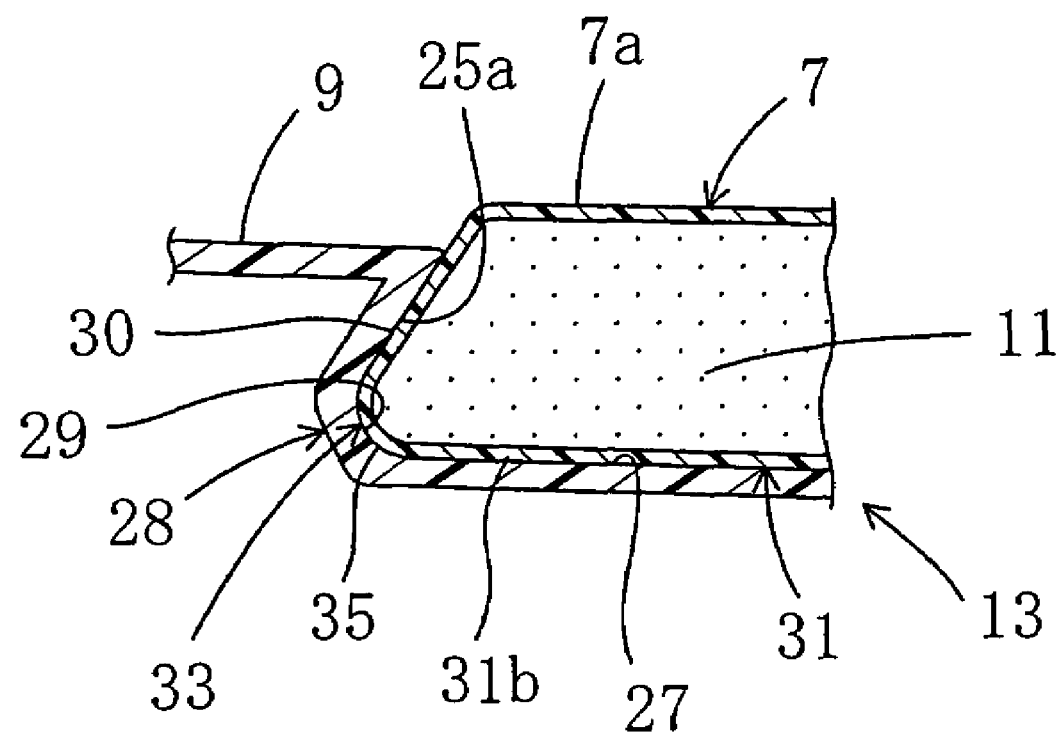
FIG. 7 is a cross-sectional view taken along the line A-A in FIG. 2.

Thus, the skin 7 and the base material 9 are sealed such that the sector-shaped corner parts 35 of the skin 7 come into tight contact with the sector-shaped corner parts 29 of the base material 9, thus preventing the resin leakage from between the corner parts 35 and 29. Even if the sector-shaped corner parts 35 of the skin 7 did not come into tight contact with the sector-shaped corner parts 29 of the base material 9 with the skin 7 fixed to the base material 9, the pressure at which the resin is charged between the skin 7 and the base material 9 would permit tight contact between the sector-shaped corner parts 35 and 29. More particularly, when a resin is charged between the skin 7 and the base material 9, the resin charging pressure acts on not only the front side cover 30 and under flanges 31b of the skin 7 but also the sector-shaped corner parts 35 of the skin 7. Therefore, as illustrated in FIG. 7, the sector-shaped corner parts 35 bend outward to stretch toward the sector-shaped corner parts 29 of the base material 9. Thus, the sector-shaped corner parts 35 come into absolute contact with the sector-shaped corner parts 29. In this way, reliable sealing between the skin 7 and the base material 9 can prevent the resin leakage from therebetween, thus providing an instrument panel 1 with an excellent appearance.

In a case in which, as illustrated by the virtual dotted line in FIG. 5, sharp corner parts are formed, instead of the sector-shaped corner parts 35, at the corners 33 of the skin 7, this enhances the rigidities of these corner parts. Therefore, these corner parts do not come into absolute contact with the corresponding corner parts of the base material 9 even in the application of the resin charging pressure to the corner parts of the skin 7. This produces clearances between the corner parts of the skin 7 and the corresponding corner parts of the base material 9, resulting in leakage of resin.

In general, if a skin 7 has been slush-molded, the sharp corner parts would facilitate increasing in rigidity due to the formation of their thicker regions resulting from the accumulation of resin and also becoming deformed to produce sink marks. To cope with this, as described in the first embodiment, formation of the sector-shaped corner parts 35 allows the corner parts 35 to have a fixed thickness, which facilitates bending of the corner parts 35. Therefore, when the skin 7 is slush-molded, the formation of the sector-shaped corner parts 35 is effective, in particular, as a countermeasure against the resin leakage.

Furthermore, both the sector-shaped corner parts 29 and 35 are shaped to gradually increase in width in the direction going from the corners 33 formed between the side covers 30 and 31a of the skin 7 toward the distal ends of the under flanges 31b. This prevents the sector-shaped corner parts 29 and 35 from affecting the appearance of the trim. Therefore, sharp corners 33 formed between the side covers 30 and 31a are formed in corner regions of the skin 7, thereby providing a sharp appearance.

Embodiment 2

Figure 8:
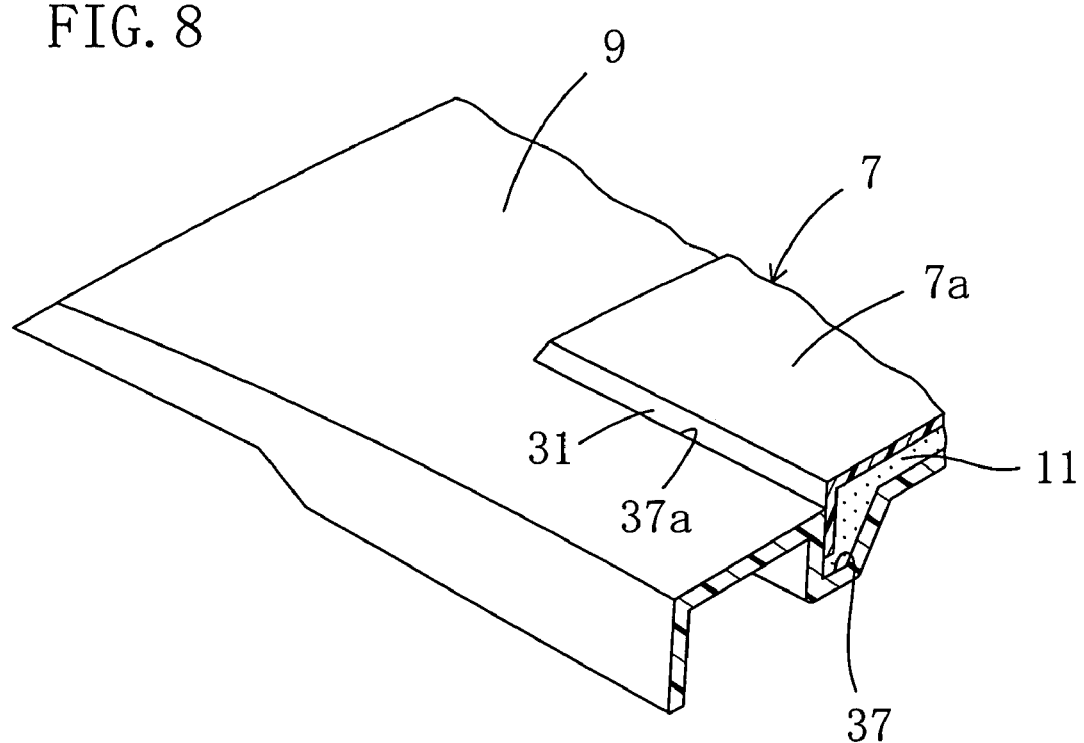
FIG. 8 is a diagram corresponding to FIG. 2 according to a second embodiment.
Figure 9:
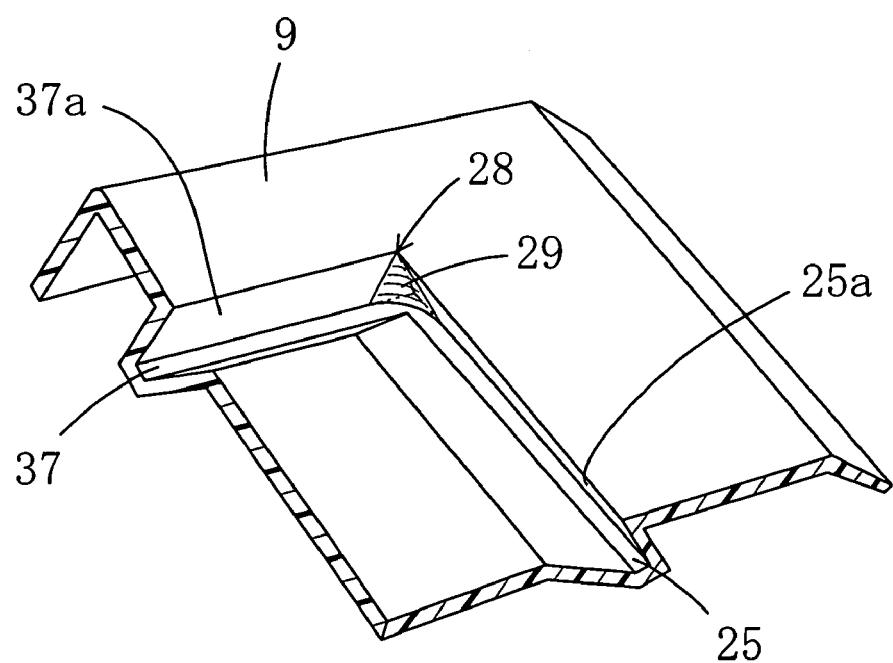
FIG. 9 is a diagram corresponding to FIG. 3 according to the second embodiment.
Figure 10:
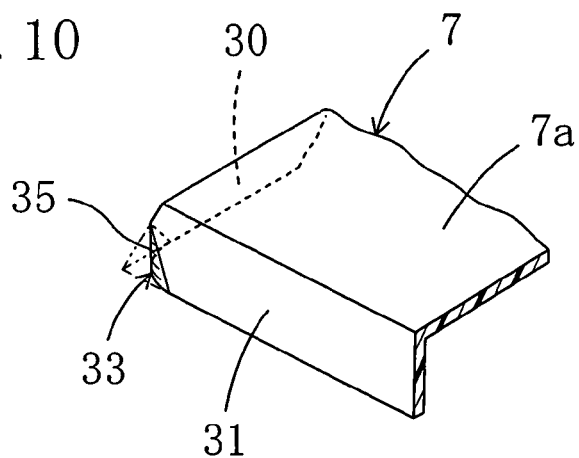
FIG. 10 is a diagram corresponding to FIG. 4 according to the second embodiment.

A second embodiment will be described with reference to FIGS. 8 through 10. In the first embodiment, a base material 9 is formed with flat faces 27 that extend from both lateral ends of a groove 25 extending along the width of an automotive body toward the rear of the automotive body. In this embodiment, as illustrated in FIG. 9, a base material 9 is formed with grooves 37, which are continuous with both lateral ends of the groove 25, like the groove 25. On the other hand, side covers 31 without under flanges are formed on the right and left sides of a skin 7 as illustrated in FIG. 10 (only the left part of the skin 7 is illustrated). As illustrated in FIG. 8, the side covers 31 are allowed to make contact with the outer side wall faces of the grooves 37 of the base material 9, i.e., cover contact faces 37a.

As illustrated in FIG. 9, sector-shaped corner parts 29 are formed at locations 28 of the corners formed between a cover contact face 25a located at the front of the groove 25 of the base material 9 and right and left cover contact faces 37a. These sector-shaped corner parts 29 gradually increase in width in the direction from the upper corners of the groove 25 toward the bottom of the groove 25. On the other hand, for the skin 7, as illustrated in FIG. 10, the side cover 30 is connected to the side covers 31 through the sector-shaped corner parts 35. The sector-shaped corner pats 35 gradually increase in width in the direction going from an upper cover 7a side toward the distal ends of the side covers 30 and 31.

In view of the above, also in the second embodiment, like the first embodiment, the sector-shaped corner parts 35 bend under the resin charging pressure to stretch outward. Thus, the sector-shaped corner parts 35 come into tight contact with the sector-shaped corner parts 29 of the base material 9. In this way, reliable sealing between the skin 7 and the base material 9 can prevent the resin leakage from therebetween, thus providing an integral skin interior trim with an excellent appearance. Furthermore, both the sector-shaped corner parts 29 and 35 are shaped to gradually increase in width in the direction going from the upper cover side toward the distal ends of the side covers. This prevents the sector-shaped corner parts 29 and 35 from affecting the appearance of the trim. Therefore, corner regions of the upper cover of the skin 7 can achieve a sharp appearance.

Other Embodiments

Figure 11A:
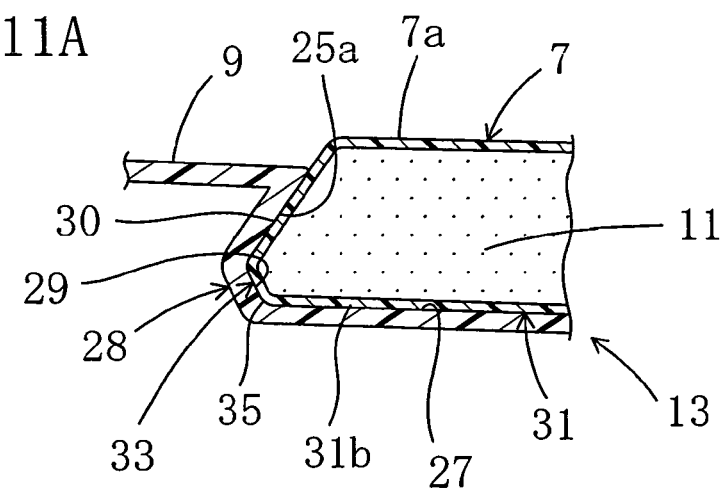
FIGS. 11A and 11B are diagrams corresponding to FIG. 7 and illustrating other exemplary sector-shaped corner parts.
Figure 11B:
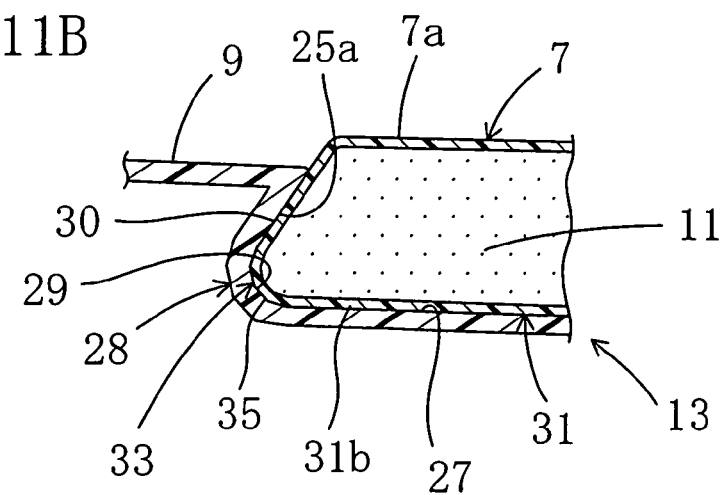
Figure 12A:
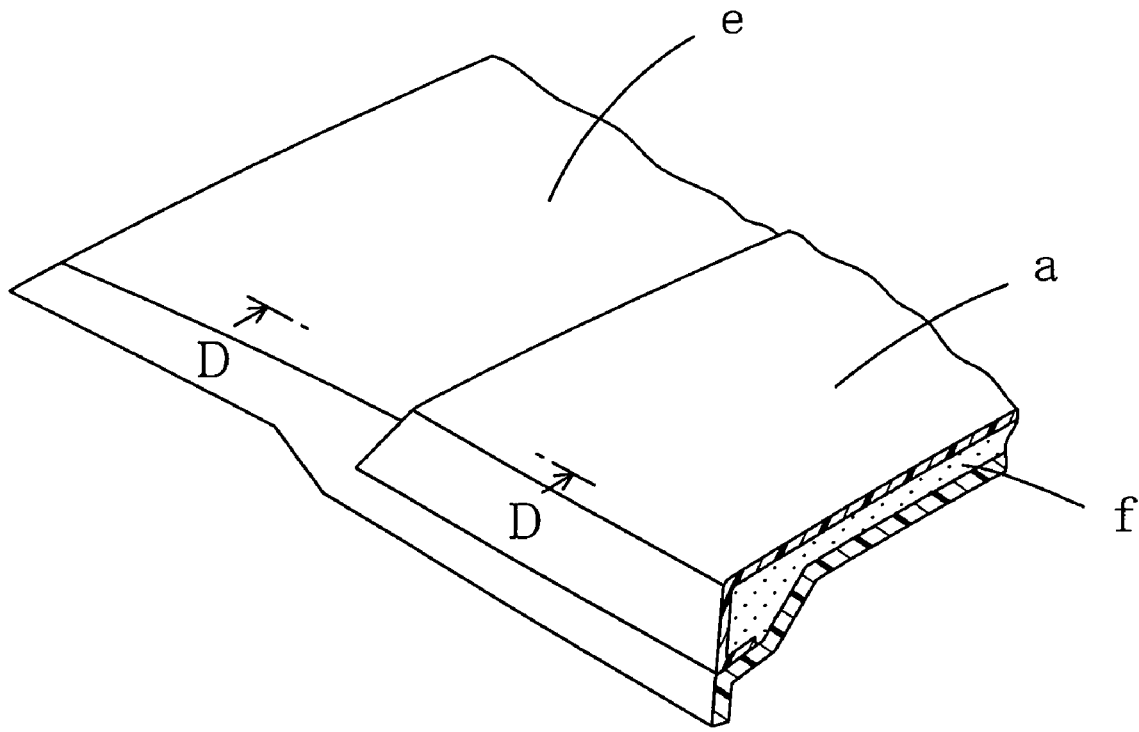
FIG. 12A is a diagram corresponding to FIG. 2 in a known example.
Figure 12B:
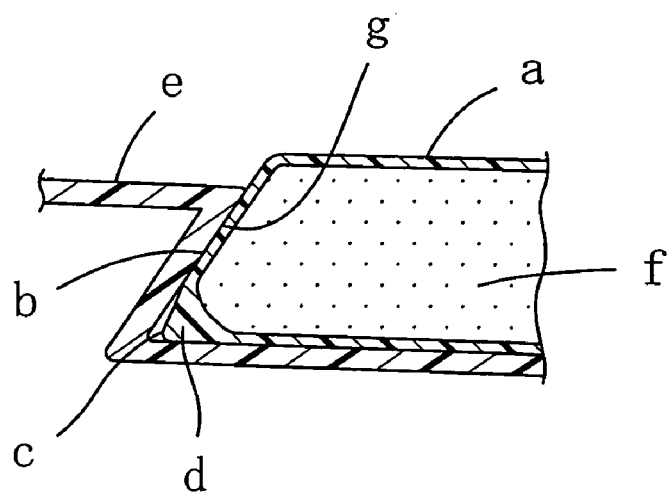
FIG. 12B is a cross-sectional view taken along the line D-D in FIG. 12A.

Although in the first and second embodiments sector-shaped corner parts 35 and 29 of the skin 7 and the base material 9 are formed to have a radius shape, they may be formed in a plane or polygonal shape to prevent formation of an acute angle as illustrated in FIGS. 11A and 11B.

The present invention is not limited to the embodiments described above, and various changes may be made without departing form the spirit and the scope of the present invention as recited in the appended claims.

What is claimed is:

1. An integral skin interior trim comprising:
a resin interlayer;
a flexible skin; and
a rigid base material,
said resin interlayer being molded between and integrally with the skin and the base material, wherein:
the skin comprises an upper cover covering the top face of the interlayer, side covers extending from two edges of the upper cover between which a corner is formed to cover the sides of the interlayer corresponding to the two edges, and an under flange extending from the end of one of the side covers to enter between the rear face of the interlayer and the base material;
the base material comprises a cover contact face coming into tight contact with the outer face of the other of the side covers and a flange contact face coming into tight contact with the lower face of the under flange;
the side covers are connected to each other to form a corner;
the other of the side covers is connected to the under flange through a sector-shaped corner part of the skin gradually increasing in width in the direction going from the corner formed between the side covers toward the distal end of the under flange; and
the cover contact face and flange contact face of the base material are connected to each other through a sector-shaped corner part of the base material corresponding to the sector-shaped corner part of the skin.

2. An integral skin interior trim comprising:
a resin interlayer;
a flexible skin; and
a rigid base material,
said resin interlayer being molded between and integrally with the skin and the base material, wherein:
the skin comprises an upper cover covering the top face of the interlayer and side covers extending from two edges of the upper cover between which a corner is formed to cover the sides of the interlayer corresponding to the two edges;
the base material comprises cover contact faces coming into tight contact with the outer faces of the side covers;
the side covers are connected to each other through a sector-shaped corner part of the skin gradually increasing in width in the direction from the upper cover side toward the distal ends of the side covers; and
the cover contact faces of the base material are connected to each other through a sector-shaped corner part of the base material corresponding to the sector-shaped corner part of the skin.

3. The integral skin interior trim of claim 1 or 2, wherein the sector-shaped corner parts are both curved to expand outward.

4. The integral skin interior trim of claim 1 or 2, wherein the skin is slush-molded.

* * * * *